United States Patent
Yamaguchi

(10) Patent No.: US 6,702,308 B2
(45) Date of Patent: Mar. 9, 2004

(54) REAR SUSPENSION

(75) Inventor: Takashi Yamaguchi, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/977,374

(22) Filed: Oct. 16, 2001

(65) Prior Publication Data

US 2002/0053777 A1 May 9, 2002

(30) Foreign Application Priority Data

Oct. 16, 2000 (JP) .................................... 2000-314534

(51) Int. Cl.⁷ ................................................ B60G 11/18
(52) U.S. Cl. ........................ 280/124.166; 280/124.11; 280/124.116
(58) Field of Search .................... 280/124.164, 124.166, 280/124.1, 124.106, 124.109, 124.11, 124.116, FOR 115, FOR 152, FOR 178

(56) References Cited

U.S. PATENT DOCUMENTS 4,165,099 A * 8/1979 Wagner et al.
4,486,030 A * 12/1984 Takata et al.
5,813,691 A    9/1998 Aoki et al.
6,267,397 B1 * 7/2001 Hamada et al.

FOREIGN PATENT DOCUMENTS

JP      58-105815    * 6/1983 .......... 280/124.106
JP      8-324218 A    12/1996

* cited by examiner

Primary Examiner—Eric Culbreth
(74) Attorney, Agent, or Firm—Birch, Stewart, Kolasch & Birch, LLP

(57) ABSTRACT

In a vehicle rear suspension, each of right and left trailing arms (1) is bent upward at a bent part in an intermediate area between a front end cylindrical portion (2) and a rear end portion (3) so that the trailing arms (1) can be bent. Each end of a torsion beam (7), having a substantially U-shaped cross-section, is connected to an upward inclining area of each trailing arm (1) inclining from the rear end portion (3) toward the bending part (6). This makes it possible to arrange the torsion center of the torsion beam (7) having the substantially U-shaped section in a relatively high position and to maintain the strength of the torsion beam (7) at a high level.

5 Claims, 3 Drawing Sheets

REAR SUSPENSION

This nonprovisional application claims priority under 35 U.S.C. §119(a) on Patent Application No. 2000-314534 filed in Japan on Oct. 16, 2000, which is herein incorporated by reference.

BACKGROUND OF THE INVENTION

1. Field of the Invention

This invention generally relates to a rear suspension structure, and more particularly to a rear suspension whose right and left trailing arms are connected to each other through a torsion beam extending substantially along the width of a vehicle.

2. Description of Related Art

As disclosed in Japanese Patent Laid-open Publication No. 8-324218, a conventional vehicle rear suspension has a twist beam extending substantially along the width of the vehicle to connect a pair of right and left trailing arms, i.e. a torsion beam having a U-shaped section opened toward the front of the vehicle and a curved portion curved upward in the central section. In the curved portion, the radius of curvature is increased from the center toward both ends so that both ends can be linear. This prevents the rear suspension from interfering with a propeller shaft, and increases rigidity of the torsion beam since the curved portion is formed at the center of the torsion beam where a relatively small bending moment is applied.

The conventional rear suspension, however, has problems in that the torsion beam does not have a sufficient strength since it is bent vertically, and that the torsion beam must be increased in weight in order to have a sufficient strength.

SUMMARY OF THE INVENTION

It is therefore an object of the present invention to provide a vehicle rear suspension having a pair of right and left trailing arms connected to each other through a torsion beam, the vehicle rear suspension enabling the torsion center of the torsion beam to be arranged in a relatively high position and maintains the strength of the torsion beam at a high level.

The above object can be accomplished by providing a rear suspension comprising: a pair of right and left trailing arms arranged substantially along a length of a vehicle and having front ends thereof pivotally supported by a vehicle body and rear ends thereof supporting wheels; a torsion beam extending substantially along a width of the vehicle and having both ends thereof respectively connected to the right and left trailing arms; and wherein the trailing arms are bent upward in intermediate areas between the front ends and the rear ends such that the trailing arms are bent. It is therefore possible to arrange the torsion beam in a high position.

In one preferred form of the present invention, the respective end portions of the torsion beam are connected to inclining areas of the trailing arms inclining toward the front of the vehicle. In another preferred form of the present invention, the torsion beam extends linearly. In yet another preferred form of the present invention, the torsion beam is opened diagonally downward toward the back of the vehicle. In yet another preferred form of the present invention, the torsion beam has a substantially U-shaped section. Thus, a roll center of the vehicle body extending diagonally downward toward the front of the vehicle via the torsion center of the torsion beam can be inclined at a proper angle. It is therefore possible to easily improve the ride comfort characteristics of the vehicle and properly control the strength of a roll steer. This increases the degree of freedom in deciding the suspension characteristics of the vehicle. Moreover, the strength of the torsion beam can easily be maintained at a high level, and in particular, there is no need for increasing the weight of the torsion beam so as to increase the strength. Further, each trailing arm and each end of the torsion beam are welded together while they are vertically balanced with respect to the torsion center, so that the durability of the strength at the welded part can easily be improved.

BRIEF DESCRIPTION OF THE DRAWINGS

The nature of this invention, as well as other objects and advantages thereof will be explained in the following with reference to the accompanying drawings, in which like reference characters designate the same or similar parts throughout the figures and wherein.

DETAILED DESCRIPTION OF THE PREFERRED EMBODIMENT

Figure 1:
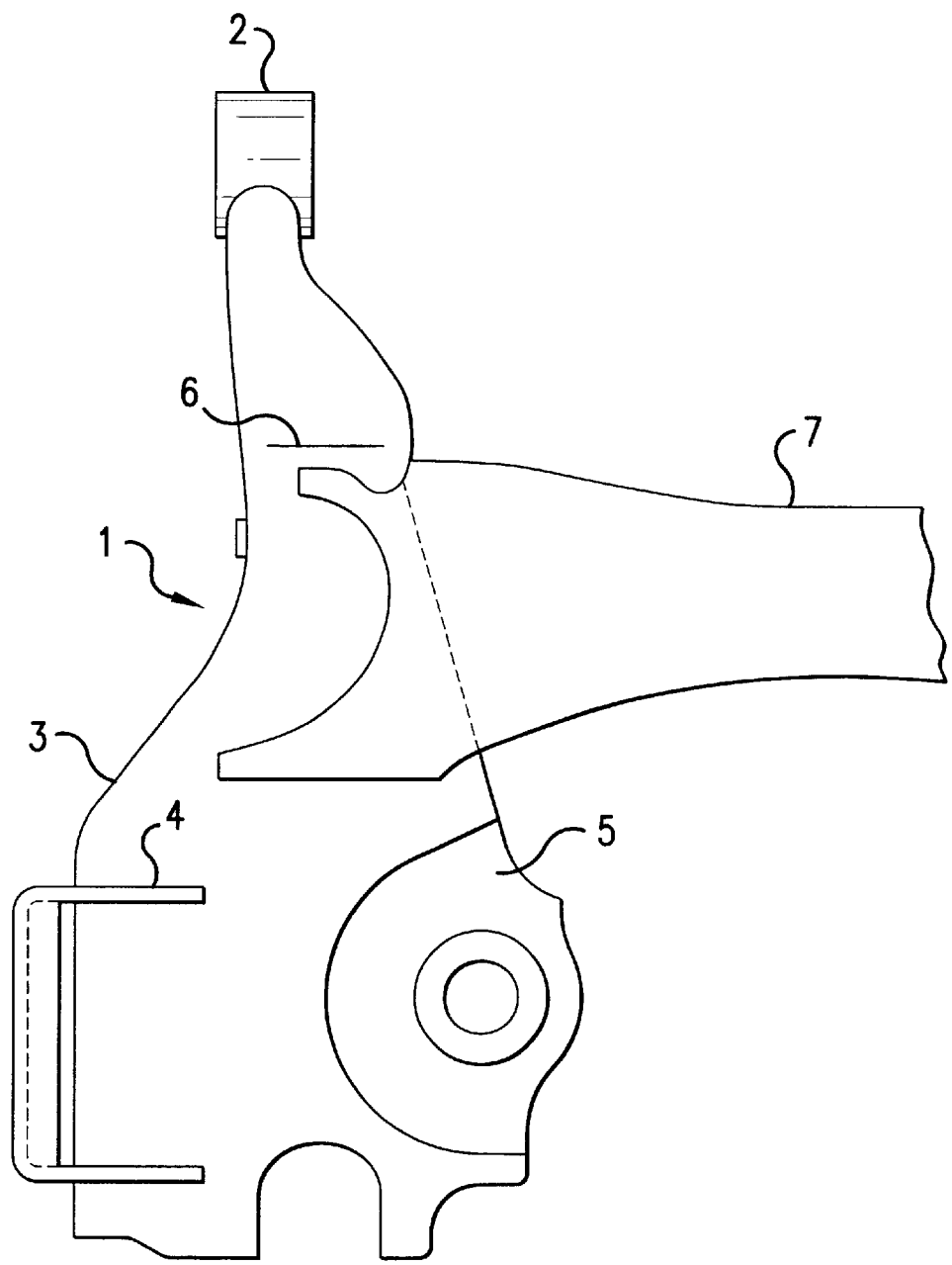
FIG. 1 is a plan view showing a principal part of a rear suspension according to an embodiment of the present invention.
Figure 2:
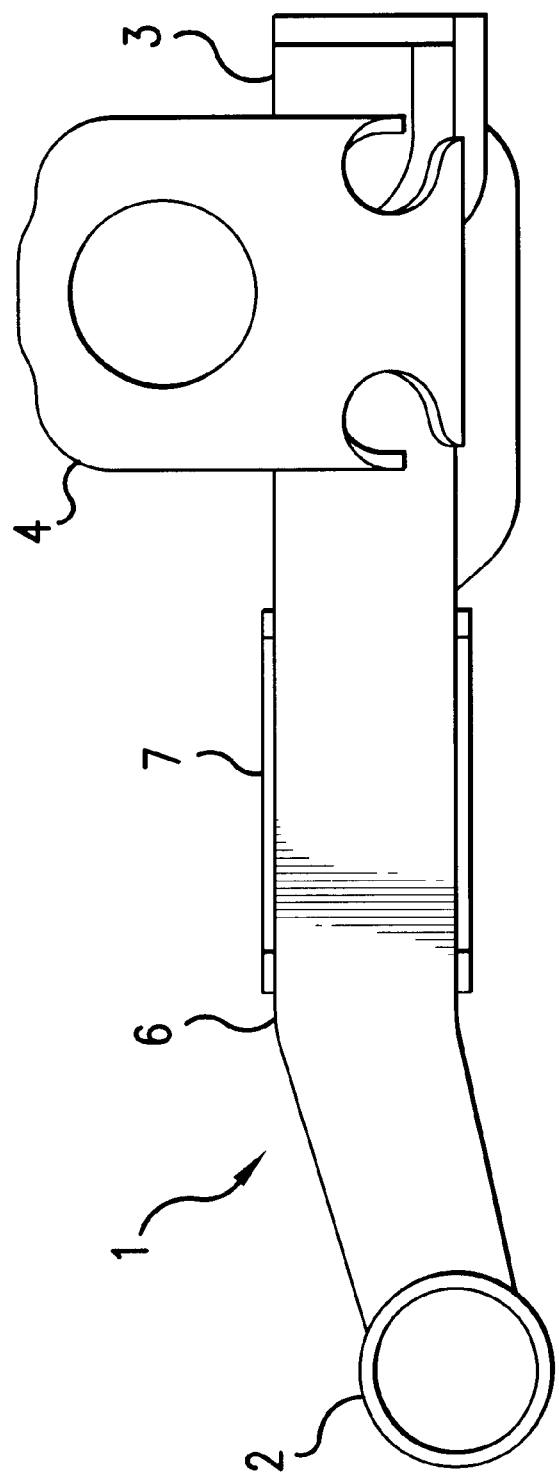
FIG. 2 is a side view showing the rear suspension according to the embodiment of the present invention.
Figure 3:
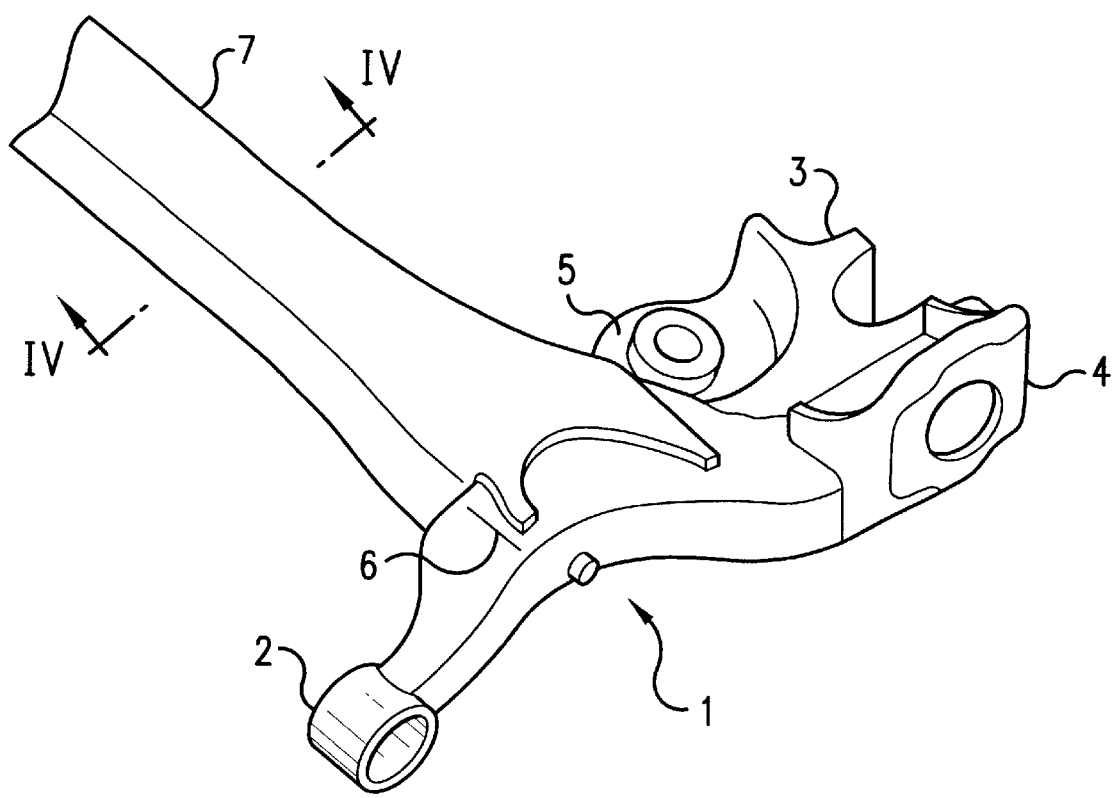
FIG. 3 is a perspective view showing the principal part of the rear suspension according to the embodiment of the present invention.
Figure 4:
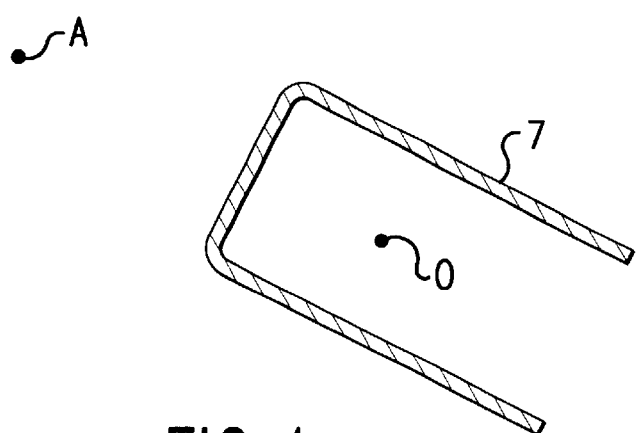
FIG. 4 is a longitudinal enlarged sectional view taken along line IV—IV in FIG. 3.

A preferred embodiment of the present invention will now be described with reference to the accompanying drawings.

In a vehicle rear suspension, a pair of right and left trailing arms 1, arranged substantially along a longitudinal direction of a vehicle, have a cavity structure with a substantially square cross-section in the lateral direction (width) of the vehicle. Each trailing arm 1 is comprised of a front end cylindrical portion 2 axially supported on a vehicle body through a bush, not shown, and a pivot extending along the width of the vehicle; and a rear end portion 3 that supports wheels, not shown, through a bracket 4 secured thereto. The vehicle rear suspension is provided with a shock absorber, not shown, such as a coil spring attached to a flat portion 5 extending toward the inner part along the width of the vehicle.

Each trailing arm 1 is bent upward at a bending part 6 in an intermediate area between the front end cylindrical portion 2 and the rear end portion 3 so that it is bent, and is attached to the vehicle body while inclining upward from the rear end portion 3 toward the bending part 6.

On the other hand, a torsion beam 7, extending linearly substantially along the width of the vehicle, has a substantially U-shaped cross-section. In proximity to the bending part 6 of each trailing arm 1, each end of the torsion beam 7 is welded to an upward inclining part where each trailing arm 1 inclines upward from the rear end portion 3 to the bending part 6. Thus, the torsion beam 7 connects the right and left trailing arms 1 while being opened diagonally downward toward the back of the vehicle.

That is, the torsion beam 7 can be arranged upward since each trailing arms 1 is bent upward at the bending part 6 in the intermediate area between the front end cylindrical portion 2 and the rear end portion 3, and in proximity to the bending part 6, both ends of the torsion beam 7 are respectively connected to the upward inclining areas of the trailing arms 1 inclining upward from the rear end portion 3 to the bending part 6. Further, since the torsion beam 7 has the substantially U-shaped cross-section and the torsion center A of the torsion beam 7 is therefore positioned at the upper side of the center of gravity O of the torsion beam 7, the torsion center A of the torsion beam 7 can be arranged in a desired position even if the torsion beam 7 extends linearly substantially along the width of the vehicle without bending vertically.

Thus, a roll center of the vehicle body extending diagonally downward toward the front of the vehicle via the torsion center A of the torsion beam 7 can be inclined at a proper angle. It is therefore possible to easily improve the ride comfort characteristics of the vehicle and properly control the strength of a roll steer. This increases the degree of freedom in deciding the vehicle suspension characteristics, which is very advantageous for designing the vehicle.

Moreover, the strength of the torsion beam 7 can easily be maintained at a high level since it extends linearly substantially along the width of the vehicle. This eliminates the need for increasing the weight of the torsion beam 7 in order to increase the strength, and the like. Further, since the torsion beam 7 has the substantially U-shaped cross-section, each trailing arm 1 and each end of the torsion beam 7 are welded together while they are vertically balanced with respect to the torsion center A. It is therefore possible to easily improve the durability of the strength at the welded part.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed:

1. A rear suspension, comprising:

a pair of right and left trailing arms provided substantially along a longitudinal direction of a vehicle, each of the right and left trailing arms having a front end thereof pivotally supported by a vehicle body and a rear end thereof supporting a wheel, each trailing arm being bent at an intermediate portion thereof such that a rear portion between the rear end and the intermediate portion inclines upward from the rear end toward the intermediate portion when attached to the vehicle; and a torsion beam extending substantially in a lateral direction of the vehicle and having both ends thereof respectively connected to the rear portion of said right and left trailing arms.

2. A rear suspension according to claim 1, wherein the respective ends of said torsion beam are connected to the rear portion in proximity of the intermediate portion.

3. A rear suspension according to claim 2, wherein said torsion beam extends substantially straight.

4. A rear suspension according to claim 1, wherein said torsion beam has an open cross section opened diagonally downward toward a back of the vehicle.

5. A rear suspension according to claim 4, wherein said torsion beam has a substantially U-shaped cross-section.

\* \* \* \* \*